(12) United States Patent
Nakashima et al.

(10) Patent No.: US 9,698,931 B2
(45) Date of Patent: Jul. 4, 2017

(54) APPARATUS AND METHOD FOR SELECTING A CHANNEL TO BE SET TO A PATH IN A COMMUNICATION NETWORK

(71) Applicant: FUJITSU LIMITED, Kawasaki-shi, Kanagawa (JP)

(72) Inventors: Mineshi Nakashima, Kawasaki (JP); Yasuko Nozu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 14/851,373

(22) Filed: Sep. 11, 2015

(65) Prior Publication Data

US 2016/0080104 A1    Mar. 17, 2016

(30) Foreign Application Priority Data

Sep. 16, 2014  (JP) ................................. 2014-187811

(51) Int. Cl.
*H04J 14/02* (2006.01)
*H04L 12/721* (2013.01)
*H04L 12/911* (2013.01)

(52) U.S. Cl.
CPC ...... *H04J 14/0257* (2013.01); *H04J 14/0212* (2013.01); *H04J 14/0271* (2013.01); *H04J 14/0275* (2013.01); *H04L 45/12* (2013.01); *H04L 45/62* (2013.01); *H04L 45/70* (2013.01); *H04L 47/822* (2013.01)

(58) Field of Classification Search
None
See application file for complete search history.

(56) References Cited

FOREIGN PATENT DOCUMENTS

JP        2006-25014         1/2006

*Primary Examiner* — Darren E Wolf
(74) *Attorney, Agent, or Firm* — Staas & Halsey LLP

(57) ABSTRACT

An apparatus stores information identifying unallocated channels for each of spans, where a span indicates a section between adjacent nodes of a plurality of nodes in a communication network. The apparatus extracts unallocated channels for each of all spans provided between a start point node and an end point node of a path in the communication network, by referring to the information, and determines a channel including consecutive unallocated spans which are arranged on routes including the path and spans outside the path, and whose number is minimum among the extracted unallocated channels, as a channel to be set to the path.

6 Claims, 18 Drawing Sheets

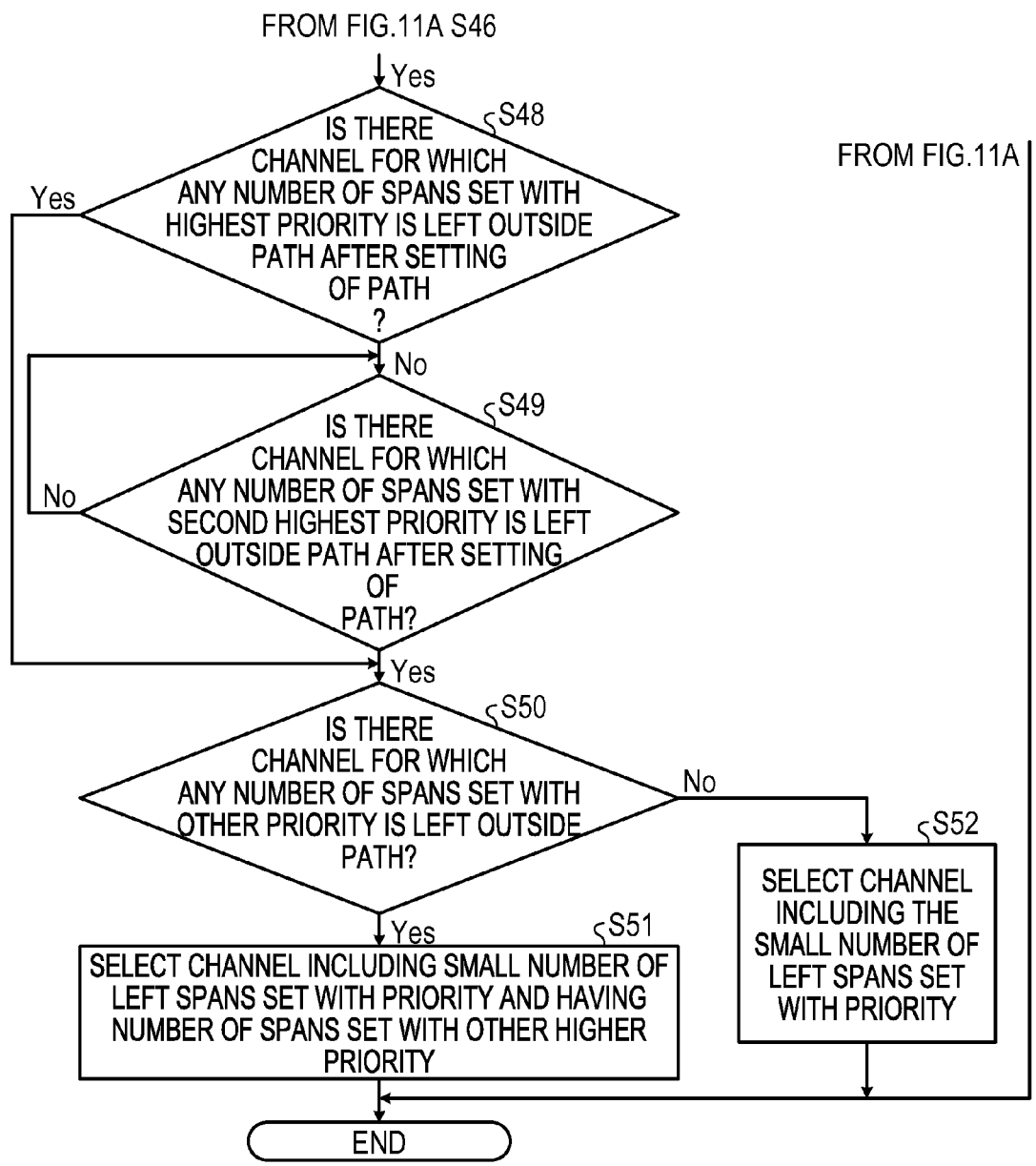

APPARATUS AND METHOD FOR SELECTING A CHANNEL TO BE SET TO A PATH IN A COMMUNICATION NETWORK

CROSS-REFERENCE TO RELATED APPLICATION

This application is based upon and claims the benefit of priority from the prior Japanese Patent Application No. 2014-187811 filed on Sep. 16, 2014, the entire contents of which are incorporated herein by reference.

FIELD

The embodiments discussed herein are related to apparatus and method for selecting a channel to be set to a path in a communication network.

BACKGROUND

A channel allocation to a new path in WDM (Wavelength Division Multiplexing) has been made by allocating to a new path a channel having the lowest channel (CH) number among unused channels consecutive in a section from the start point to end point of the new path.

A conventional channel allocation to a new path will now be described by way of an example. FIG. 17 is a view illustrating one example of how to select a CH number. The example of FIG. 17 illustrates used sections and unused sections of each channel between Site 1 to Site 8. A used section refers to a section already used by other paths. An unused section refers to a vacant section not used by other paths. For example, CH1 has a used section between Site 1 to Site 2, a used section between Site 7 to Site 8, and an unused section between Site 2 to Site 7. CH2 has a used section between Site 1 to Site 3, a used section between Site 7 to Site 8, and an unused section between Site 3 to Site 7. CH3 is a channel for which all sections are unused.

In the conventional channel allocation, for example, plural channels for which a section corresponding to a new path is unused are selected and a channel having the lowest CH number among the selected plural channels is allocated to the new path. For example, as illustrated in FIG. 17, CH1, CH2, and CH3 for which a Site 4 to Site 6 section used by a new path (1) is unused are selected. Then, among the selected channels, CH1 having the lowest CH number is allocated to the new path (1).

Related technologies are disclosed in, for example, Japanese Laid-Open Patent Publication No. 2006-025014.

SUMMARY

According to an aspect of the invention, an apparatus stores information identifying unallocated channels for each of spans, where a span indicates a section between adjacent nodes of a plurality of nodes in a communication network. The apparatus extracts unallocated channels for each of all spans provided between a start point node and an end point node of a path in the communication network, by referring to the information, and determines a channel including consecutive unallocated spans which are arranged on routes including the path and spans outside the path, and whose number is minimum among the extracted unallocated channels, as a channel to be set to the path.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 11A and 11B are diagrams illustrating an example of an operational flowchart for selecting a channel used for a path, according to an embodiment;

DESCRIPTION OF EMBODIMENTS

In the above-described conventional technique, however, there may be present a channel for which an unused section is divided and discontinuously scattered in a network.

Figure 17:
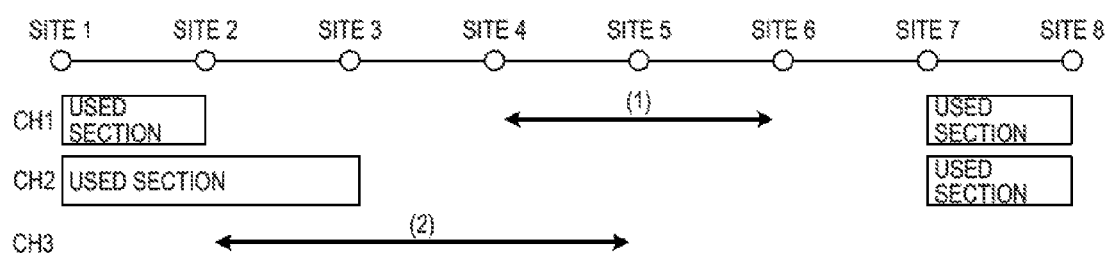
FIG. 17 is a diagram illustrating an example of a method for selecting a CH number.

For example, as illustrated in FIG. 17, when the new path (1) is set to CH1, the unused section of CH1 of Site 2 to Site 7 is divided to generate an unused section of Site 2 to Site 4 and unused section of Site 6 to Site 7 which are discontinuously scattered in CH1. Next, when a new path (2) is set between Site 2 and Site 5, CH1 may not be allocated to the new path (2) since the new path (1) uses Site 4 to Site 5 in CH1 and overlaps with the new path (2). In addition, CH2 may not be allocated to the new path (2) since Site 2 to Site 3 is a used section in CH2 and the used section overlaps with the new path (2). Therefore, CH3 for which Site 2 to Site 5 is an unused section is allocated to the new path (2). That is, a new channel is allocated to the new path (2).

In this manner, when a channel having the smallest CH number among vacant channels in sections set with new paths is allocated to the new paths, a channel having discontinuously scattered unused sections is generated.

Hereinafter, embodiments of a network designing apparatus of the present disclosure will be described with reference to the drawings. It should be understood herein that the scope of the present disclosure is not limited by these embodiments which may be in proper combination unless contradictory.

[Embodiment 1]

(Configuration of Network Designing Apparatus of First Embodiment)

Figure 1:
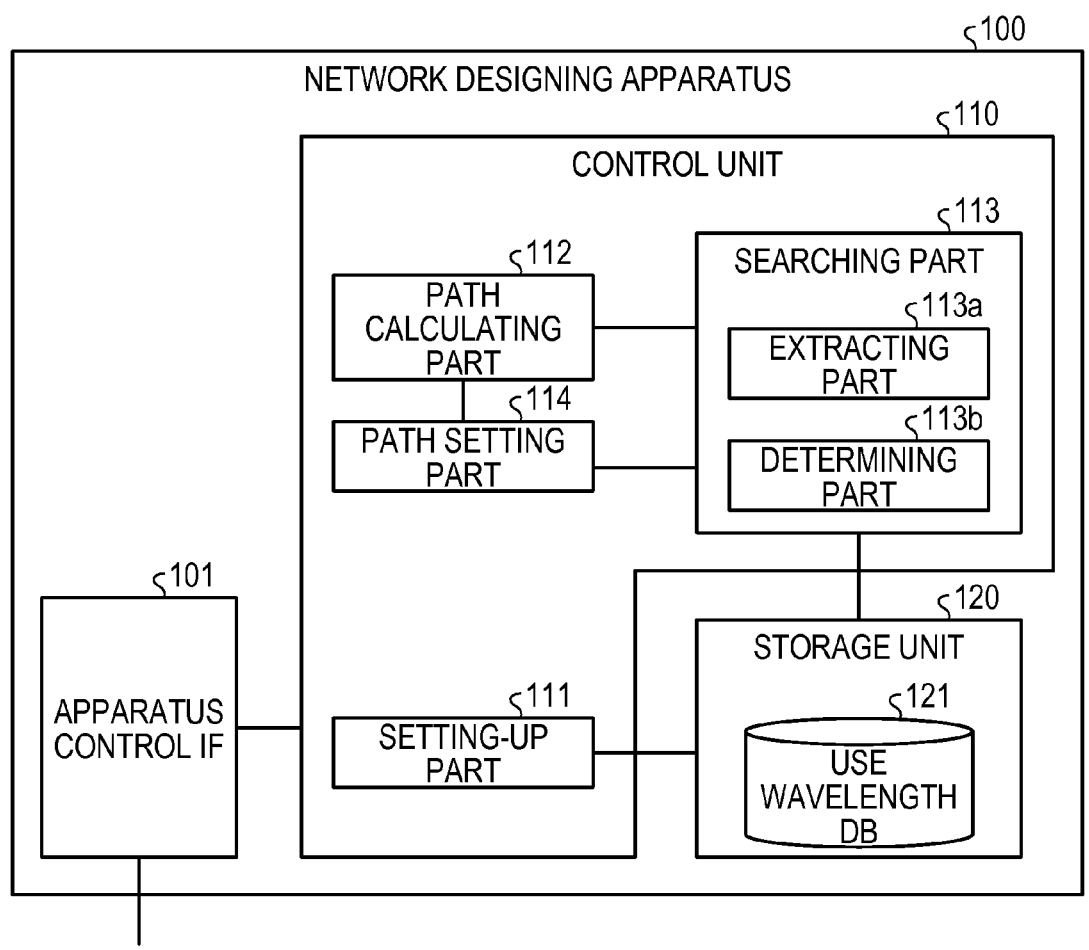
FIG. 1 is a diagram illustrating an example of a configuration of a network designing apparatus, according to an embodiment.

FIG. 1 is a view illustrating one example of the configuration of a network designing apparatus according to a first embodiment. As illustrated in the example of FIG. 1, a network designing apparatus 100 includes an apparatus control IF 101, a control unit 110, and a storage unit 120. The apparatus control IF 101 is an interface for controlling other sites via a network. The apparatus control IF 101 controls the sites and sets a path based on setting information output from a path setting part 114. The control by the apparatus control IF 101 is implemented by, for example, NIC (Network Interface Card).

The storage unit 120 includes a use wavelength database (DB) 121. The use wavelength DB 121 is a database containing topology information of a network. Examples of the topology information contained in the use wavelength DB 121 may include information on sites in the network, information on fibers between adjacent sites, and information on channels used on the fibers. As used herein, the term "fiber" refers to a path between adjacent sites. The use wavelength DB 121 stores, as the information on channels used on the fibers, a vacant channel for each span. As used herein, the phrase "vacant channel for each span" refers to a channel having an unused (unallocated) section. Hereinafter, the phrase "unallocated" will be also used to express the same meaning as "vacant".

For example, it is assumed that channels of CH1 to CH7 are provided and CH1, CH3, and CH4 are being used between Site 1 to Site 2. In this case, the use wavelength DB 121 contains information indicating that CH1, CH3, and CH4 are in use, as information on channels being used on fibers. The network designing apparatus 100 may derive information indicating that vacant (unallocated) channels between Site 1 to Site 2 are CH2, CH5, CH6 and CH7, from the information contained in the use wavelength DB 121.

The channels are allocated in the unit of wavelength. For example, when wavelengths used in the network are wavelength 1, wavelength 2, wavelength 3, . . . , in the decreasing order of wavelength, the network designing apparatus 100 allocates the wavelengths to CH1, CH2, CH3, . . . , respectively, in the order of increasing channel number. The wavelengths may be allocated to the channels in random.

The storage unit 120 corresponds to a semiconductor memory device, such as RAM (Random Access Memory), ROM (Read Only Memory), or a flash memory, or a storage device, such as a hard disk, or an optical disc.

(Configuration of Control Unit)

The control unit 110 of the network designing apparatus 100 includes a setting-up part 111, a path calculating part 112, a searching part 113, and a path setting part 114. The searching part 113 includes an extracting part 113a and a determining part 113b. The functionality of the control unit 110 may be implemented by CPU (Central Processing Unit) executing a predetermined program. The functionality of the control unit 110 may also be implemented by an integrated circuit such as, for example, ASIC (Application Specific Integrated Circuit), or FPGA (Field Programmable Gate Array).

The setting-up part 111 is a processing part for constructing a topology including sites. The setting-up part 111 detects a site in the network and constructs the topology at the detected site. The setting-up part 111 stores information of the constructed topology in the use wavelength DB 121.

The path calculating part 112 is a processing part for obtaining the shortest path when paths are set. The path calculating part 112 calculates a distance of each of a plurality of set paths. The path calculating part 112 specifies the shortest path among the plurality of paths and outputs the specified path to the searching part 113 and the path setting part 114.

The searching part 113 is a processing part for searching a channel to be set in a path, among vacant channels in the shortest path obtained by the path calculating part 112. The searching part 113 includes the extracting part 113a and the determining portion 113b.

The extracting part 113a is a processing part for extracting channels for which the entire span between a start point node and an end point node corresponding to the set path is vacant, by referring to the use wavelength DB 121. The start point node refers to a node serving as a start point of a path to be set. The end point node refers to a node serving as an end point of the path to be set. The above-mentioned "site" is one example of "node."

That is, the extracting part 113a extracts channels for which all sections corresponding to a path to be set are unused sections, by referring to the use wavelength DB 121. The extracting part 113a outputs the extracted channels to the determining part 113b.

The determining part 113b receives the channels extracted by the extracting part 113a. The determining part 113b determines, among the received channels, a channel that includes the smallest number of consecutive vacant spans along a route including nodes outside of the start and end point nodes corresponding to the path, as a channel to be set for the path. The number of consecutive vacant spans refers to the number of consecutive unused sections for the channel.

That is, the determining part 113b selects a channel that includes the smallest number of consecutive unused sections along a route including nodes outside of the start and end point nodes, among the channels received from the extracting part 113a, and outputs the selected channel to the path setting part 114.

Figure 2:
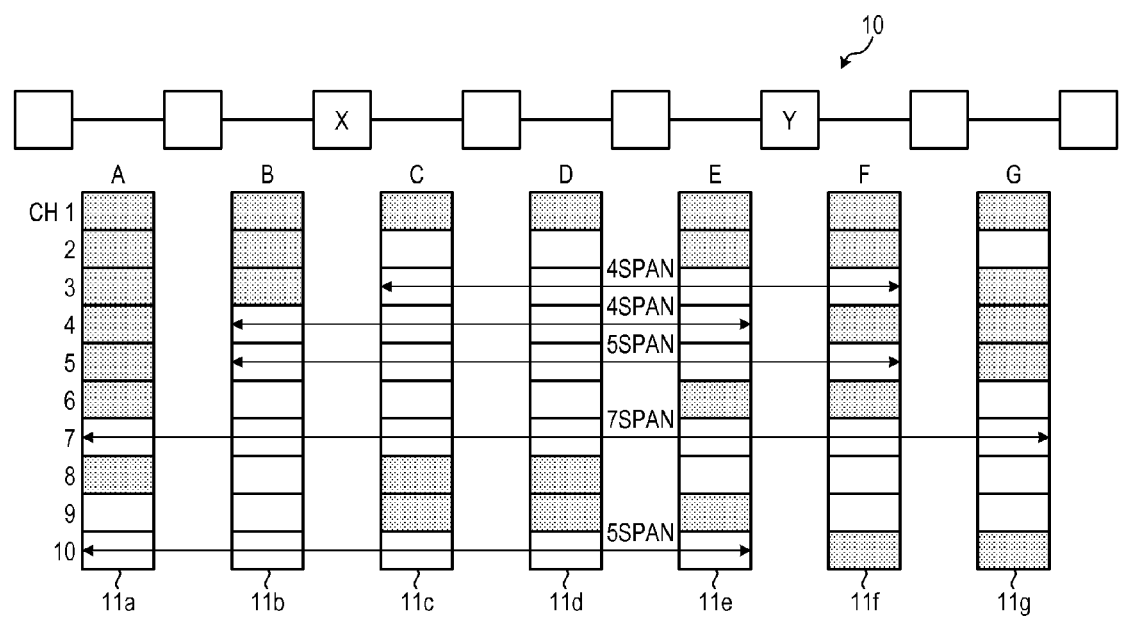
FIG. 2 is a diagram illustrating an example of a process of extracting and determining a channel, according to an embodiment.

An example of processing by the extracting part 113a and the determining part 113b will now be described with reference to FIG. 2. FIG. 2 is a first explanatory view of a process of extracting and determining a channel. A topology 10 illustrates a route on which sites constituting a network topology are arranged. The topology 10 includes a site X and a site Y. Sections of the route between sites constituting the topology 10 are denoted by sections A to G.

Statuses 11a to 11g indicate discrimination on whether the channel is used or unused in each section. The statuses 11a to 11*g* correspond to the sections A to G, respectively. A used section is shaded and an unused section is not shaded. For example, the status 11*a* indicates that CH1 to CH6 and CH8 are used and CH7, CH 9 and CH10 are unused in the section A. The status 11*b* indicates that CH1 to CH3 are used and CH4 to CH10 are unused in the section B.

When a path is set between Site X and Site Y, the extracting part 113*a* and the determining part 113*b* perform the following process. The extracting part 113*a* extracts CH3, CH4, CH5, CH7, and CH10 with the sections C to E unused and outputs the extracted channels to the determining part 113*b*.

The determining part 113*b* counts the number of spans of each of the channels output by the extracting part 113*a*. The number of spans of CH3, CH4, CH5, CH7, and CH10 are 4, 4, 5, 7 and 5, respectively. Of CH3 and CH4 having the smallest number of consecutive vacant spans, the determining part 113*b* selects CH3 having a smaller channel number. The determining part 113*b* outputs the selected CH3 to the path setting part 114. Alternatively, the determining part 113*b* may randomly select one among channels having the smallest number of consecutive vacant spans.

The path setting part 114 receives the path selected in the path calculating part 112 and the channel selected in the determining part 113*b*. The path setting part 114 controls the sites through the apparatus control IF 101 so as to set the selected path in the selected channel.

(Hardware Configuration of Transmission System According to First Embodiment)

Figure 3:
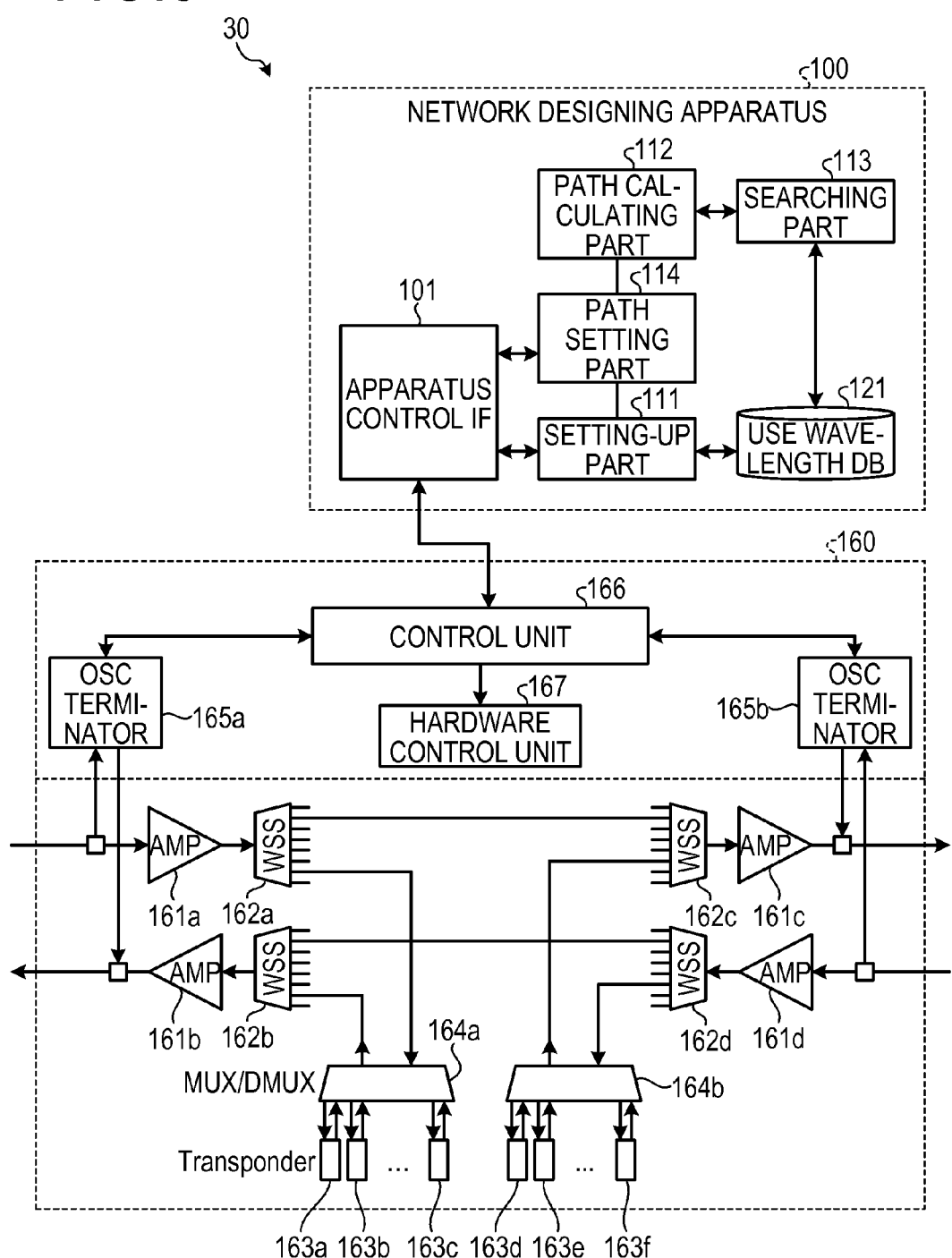
FIG. 3 is a diagram illustrating an example of a hardware configuration of a transmission system including a network designing apparatus, according to an embodiment.

FIG. 3 is a view illustrating one example of the hardware configuration of a transmission system including a network designing apparatus according to the first embodiment. As illustrated in the example of FIG. 3, a transmission system 30 includes a network designing apparatus 100 and a site 160. The network designing apparatus 100 includes an apparatus control IF 101, a setting-up part 111, a path calculating part 112, a searching part 113, a path setting part 114, and a use wavelength DB 121. The network designing apparatus 100 illustrated in FIG. 3 corresponds to the network designing apparatus 100 illustrated in FIG. 1.

The apparatus control IF 101 is connected in communication with the site 160. Although one site 160 is illustrated in the example of FIG. 3 for the sake of convenience, the apparatus control IF 101 may be connected with a plurality of sites.

The site 160 includes amplifiers (AMPs) 161*a* to 161*d*, WSSs (Wavelength Selective Switches) 162*a* to 162*d*, multiplexers/demultiplexers (MUXs/DMUXs) 164*a* and 164*b*, OSC terminators 165*a* and 165*b*, a control unit 166, and a hardware control unit 167. The MUX/DMUX 164*a* includes transponders 163*a* to 163*c*. The MUX/DMUX 164*b* includes transponders 163*d* to 163*f*.

The various components of the site 160 will be described below. The AMPs 161*a* to 161*d* amplify a WDM signal received from other sites. The WSS 162*a* and the WSS 162*d* select and divide the wavelength of the received WDM signal. In the meantime, the WSS 162*b* and the WSS 162*c* combine received signals of different wavelengths to generate a WDM signal.

The transponders 163*a* to 163*c* convert a client signal received from, for example, a router into a WDM signal. The MUX/DEMUX 164*a* combines a plurality of WDM signals received from the transponders 163*a* to 163*c* and multiplexes the combined WDM signals on one optical fiber. In the meantime, the MUX/DEMUX 164*b* demultiplexes the WDM signals to individual optical fibers, which are then received in the transponders 163*d* to 163*f*. The transponders 163*d* to 163*f* convert the received WDM signals into client signals.

The OSC terminators 165*a* and 165*b* transmit an optical monitoring signal having a wavelength different from the data wavelength to an adjacent site. In addition, the OSC terminators 165*a* and 165*b* terminate an optical monitoring signal transmitted from the adjacent site. The control unit 166 extracts the optical monitoring signal terminated in the OSC terminators 165*a* and 165*b* and monitors the state of an optical signal. The hardware control unit 167 receives the state of the optical signal from the control unit 166 and controls various hardware based on the state of the optical signal.

(Flow illustrating Path Setting Sequence)

Figure 4:
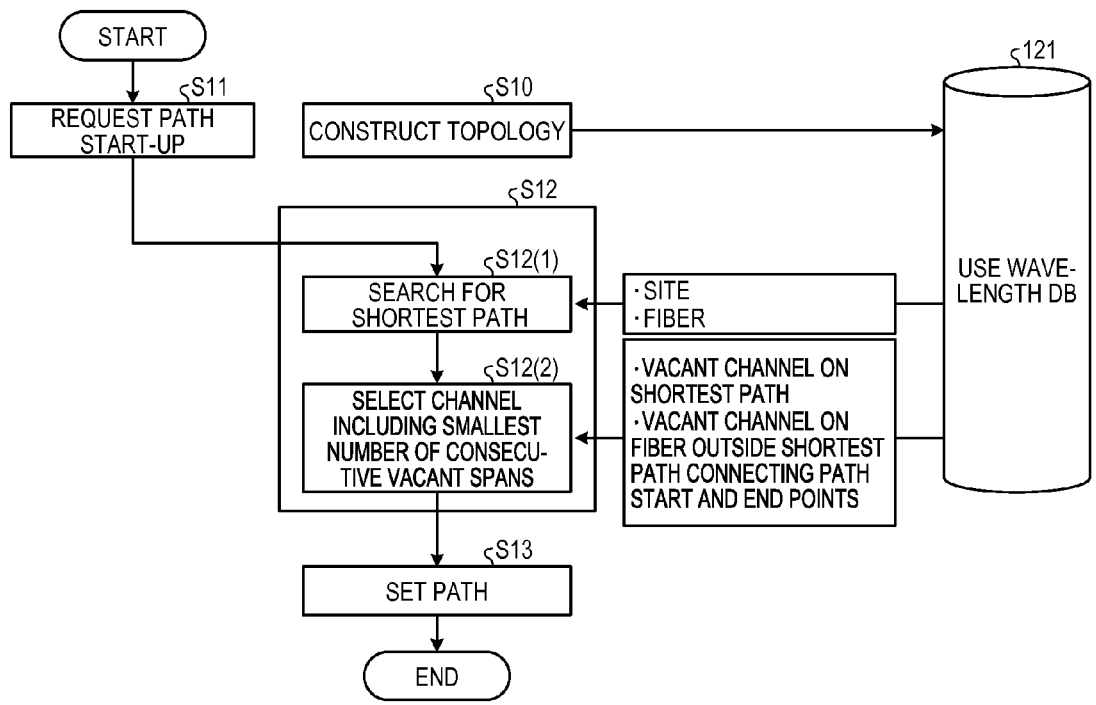
FIG. 4 is a diagram illustrating an example of an operational flowchart for a path setting sequence, according to an embodiment.

FIG. 4 is a first flowchart illustrating a path setting sequence. The setting-up part 111 detects a site in the network and constructs a topology in the detected site (Step S10). The setting-up part 111 stores information of the constructed topology in the use wavelength DB 121.

The network designing apparatus 100 receives a path start-up request (Step S11). The path calculating part 112 acquires information on the site and fiber by referring to the use wavelength DB 121 and searches for the shortest path based on the acquired information (Step S12(1)).

The extracting part 113*a* acquires information on unused sections on the shortest path by referring to the use wavelength DB 121. Based on the acquired information, the extracting part 113*a* extracts channels for which all sections from a start point site to an end point site are unused on the shortest path. The determining part 113*b* determines a channel that includes the smallest number of consecutive vacant spans along a route including nodes outside of the start and end point nodes, among the channels extracted by the extracting part 113*a*, as a channel to be set in the path (Step S12(2)).

The path setting part 114 controls each site through the apparatus control IF 101 so as to set the path selected in the path calculating part 112 to the channel selected in the determining part 113*b* (Step S13).

(Flow illustrating Channel Selecting Sequence)

Figure 5:
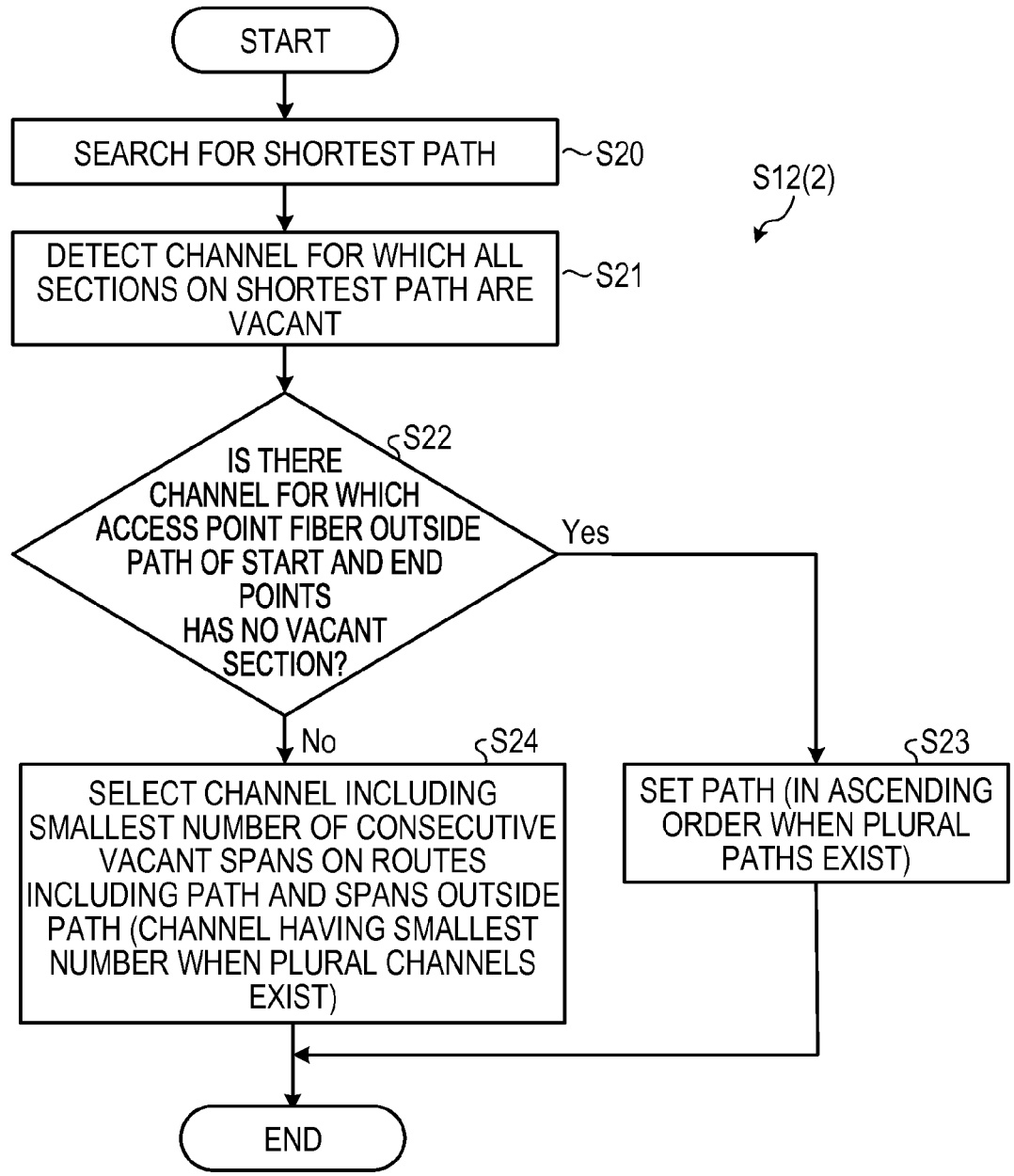
FIG. 5 is a diagram illustrating an example of an operational flowchart for selecting a channel used for a path, according to an embodiment.

FIG. 5 is a second flowchart illustrating a channel selecting sequence used for paths. The flow of FIG. 5 corresponds to Step S12. The path calculating part 112 acquires information on the site and fiber by referring to the use wavelength DB 121 and searches for the shortest path based on the acquired information (Step S20).

The extracting part 113*a* detects channels for which all sections on the shortest path are vacant (Step S21). The determining part 113*b* determines whether or not there is a channel for which an access point fiber outside the path of start and end points has no vacant space, among the channels detected by the extracting part 113*a* (Step S22). That is, the determining part 113*b* determines whether or not there exists a channel for which the number of vacant spans becomes 0 when the path is set since only sections between the start point site and the end point site are unused.

When there is a channel for which an access point fiber outside the path of start and end points has no vacant space (Yes in Step S22), the determining part 113*b* sets the channel to the path (Step S23). In the meantime, when there is no channel for which an access point fiber on the route outside the path of start and end points has no vacant space (No in Step S22), the determining part 113*b* proceeds to Step S24.

The determining part 113*b* selects a channel including the smallest number of consecutive vacant spans on routes including the path and spans outside the path, among the channels detected by the extracting part 113a (Step S24). For example, when the extracting part 113a detects a channel including four consecutive vacant spans and a channel including five consecutive vacant spans, the determining part 113b selects the channel including four consecutive vacant spans. When a plurality of channels including the smallest number of consecutive vacant spans exists, the determining part 113b selects a channel having a smaller channel number.

(Advantages)

As described above, the network designing apparatus 100 includes the storage unit storing unallocated channels for each span which is a section between adjacent ones of a plurality of nodes forming a network. The network designing apparatus 100 includes the extracting part 113a for extracting unallocated channels in the entire span between the start point node and the end point node of a path set on the network by referring to the storage unit. The network designing apparatus 100 includes the determining part 113b for determining a channel that includes consecutive unallocated spans in the entire spans between the start point node and the end point node corresponding to the path and includes the smallest number of consecutive unallocated spans including spans outside of the start and end point nodes, among the channels extracted by the extracting part, as a channel set to the path. This may result in prevention of a channel for which an unused section is divided and discontinuously scattered.

Figure 6:
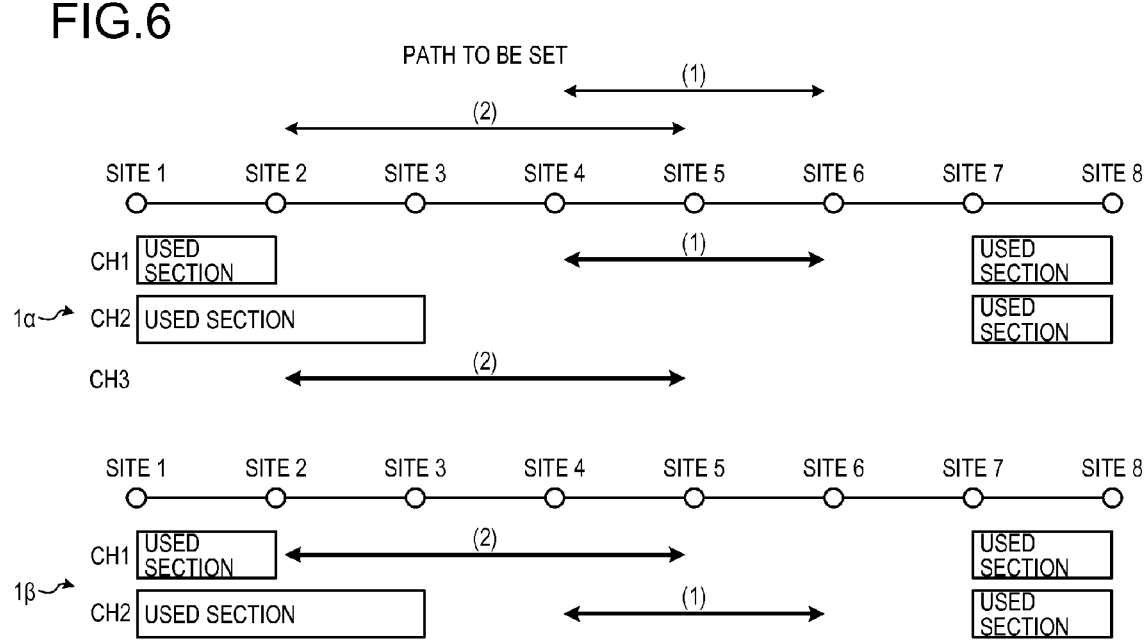
FIG. 6 is a diagram illustrating an example of comparison in advantages between a reference example and an embodiment.

FIG. 6 is a view for comparison in advantages between a reference example and the first embodiment. The example of FIG. 6 illustrates a path setting 1α of the reference example and a path setting 1β of the first embodiment. The path setting 1α of the reference example and the path setting 1β of the first embodiment include the same used and unused sections as in the example of FIG. 17.

A network designing apparatus according to the reference example selects CH1 having the smallest channel number among CH1, CH2, and CH3 to which a path (1) is able to be set, and sets the path (1) to CH1. Next, the network designing apparatus sets a path (2) to the unused CH3 since the path (2) is unable to be set to CH1 and CH2.

In the meantime, the network designing apparatus 100 according to the first embodiment selects CH2 including the smallest number of consecutive vacant spans among CH1, CH2, and CH3 to which the path (1) is able to be set, and sets the path (1) to CH2. Next, the network designing apparatus 100 sets the path (2) to CH1. In this manner, since the network designing apparatus 100 according to the first embodiment sets the paths (1) and (2) to the used channels, the network designing apparatus 100 may more effectively utilize network resources than the network designing apparatus of the reference example.

[Embodiment 2]

(Configuration of Network Designing Apparatus of Second Embodiment)

Figure 7:
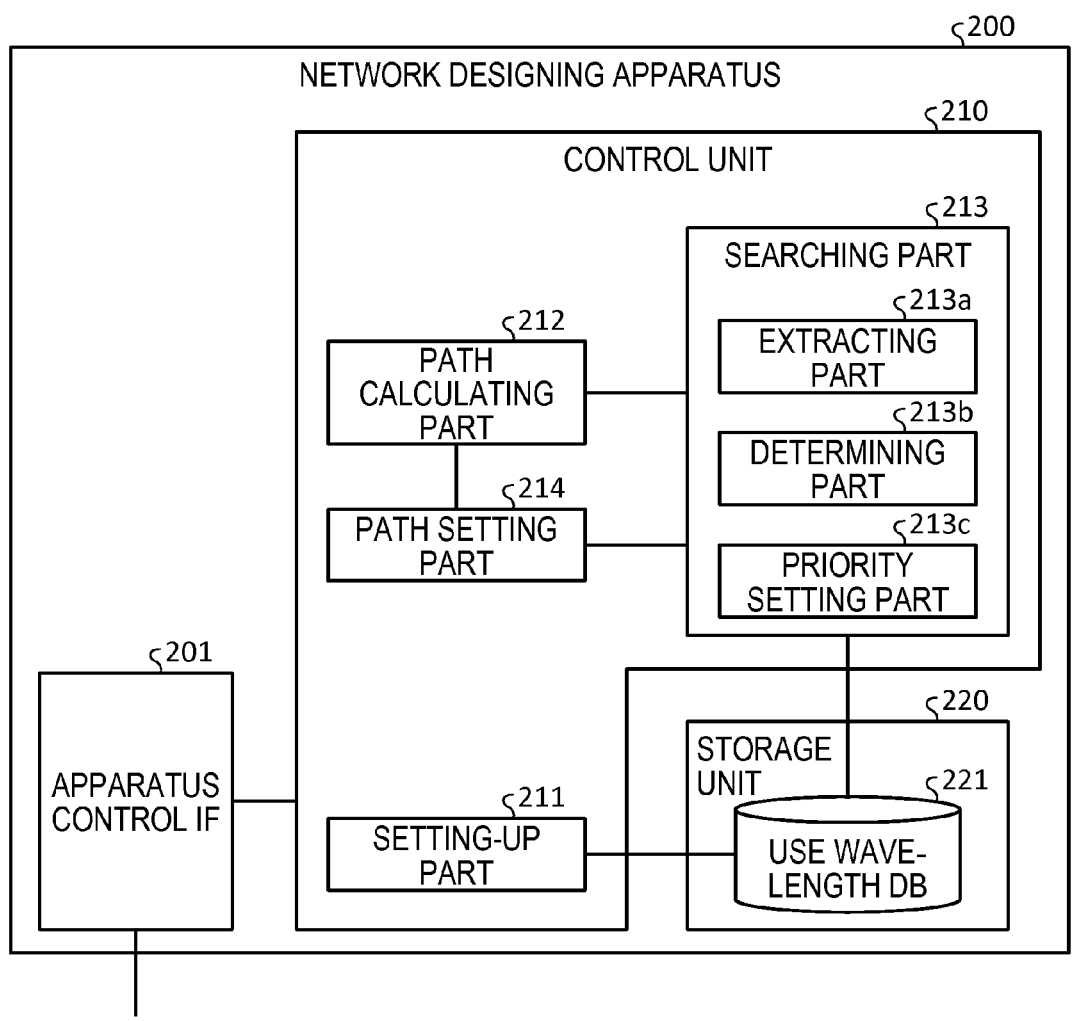
FIG. 7 is a diagram illustrating an example of a configuration of a network designing apparatus, according to an embodiment.

FIG. 7 is a view illustrating one example of the configuration of a network designing apparatus according to a second embodiment. Referring to the example of FIG. 7, a network designing apparatus 200 includes an apparatus control IF 201, a control unit 210, and a storage unit 220. The same elements as the network designing apparatus 100 of the first embodiment are denoted by the same reference numerals except for the first digit and explanation of which will not be repeated as appropriate.

The storage unit 220 includes a use wavelength database (DB) 221. The storage unit 220 corresponds to a semiconductor memory device such as RAM, ROM, or a flash memory, or a storage device such as a hard disk, or an optical disc.

The control unit 210 of the network designing apparatus 200 includes a setting-up part 211, a path calculating part 212, a searching part 213, and a path setting part 214. The searching part 213 includes an extracting part 213a, a determining part 213b, and a priority setting part 213c. The functionality of the control unit 210 may be implemented by CPU executing a predetermined program. The functionality of the control unit 210 may be also implemented by an integrated circuit, such as ASIC or FPGA.

The network designing apparatus 200 according to the second embodiment has the same configuration as the network designing apparatus 100 according to the first embodiment except for the priority setting part 213c which will be described below. The priority setting part 213c is a processing part for setting a priority for each number of spans of a path. As used herein, the phrase "number of spans of a path" refers to the number of sections between the start point and end point of a set path. For example, the priority setting part 213c counts the number of spans of all paths on the network to calculate the use frequency of each number of spans. Then, the priority setting part 213c sets a priority to the number of frequently used spans.

For example, as a result of count for the number of spans of all paths on the network, when the number of most frequently used spans is three and the number of next frequently used spans is two, the priority setting part 213c sets the highest priority to the three spans and the next highest priority to the two spans.

The extracting part 213a extracts channels for which all sections for a set path are unused, by referring to the use wavelength DB 221. Among the channels extracted by the extracting part 213a, when there is any channel for which any number of consecutive vacant spans set with priorities is left after setting of the path, the determining part 213b sets the channel to the path. In the meantime, among the channels extracted by the extracting part 213a, when there is no channel for which any number of consecutive vacant spans set with priorities is left after setting of the path, the determining part 213b determines a channel having the smallest number of consecutive vacant spans, as a channel set to the path. Hereinafter, channel selection will be described by way of example.

Figure 8:
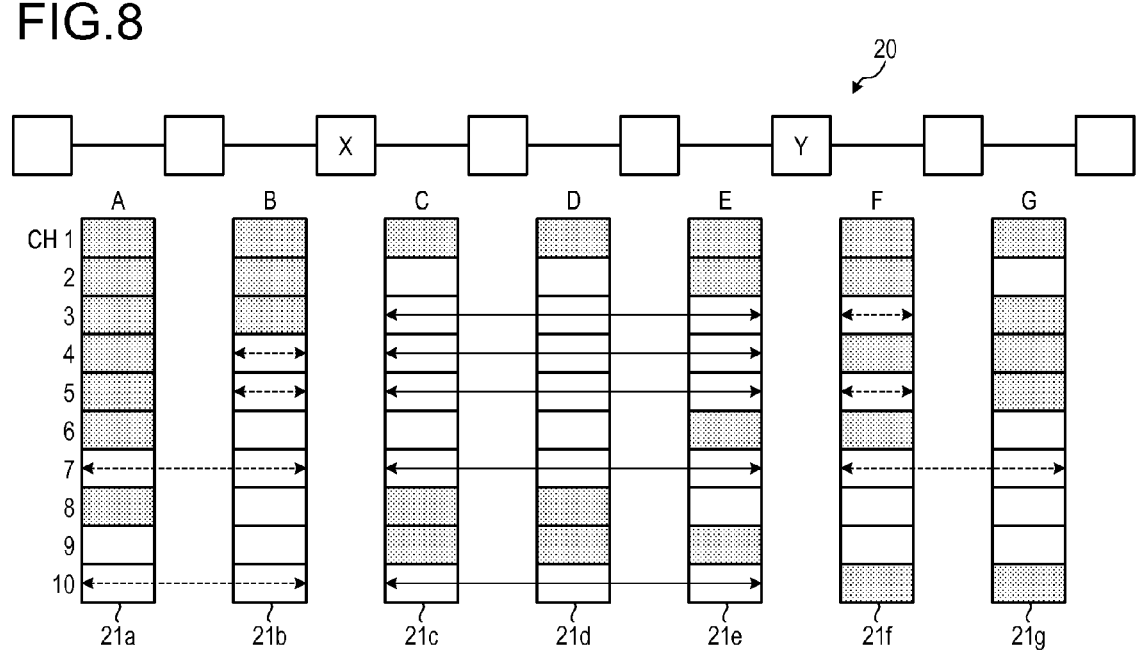
FIG. 8 is a diagram illustrating an example of a process of extracting and determining a channel, according to an embodiment.

FIG. 8 is a second explanatory view of a process of extracting and determining a channel. A topology 20 and statuses 21a to 21g illustrated in the example of FIG. 8 are the same as the topology 10 and statuses 11a to 11g illustrated in FIG. 2.

The priority setting part 213c counts the number of spans of all paths on the network to calculate the use frequency of each number of spans. Based on a result of the calculation of the use frequency of each number of spans, the priority setting part 213c sets a priority to the number 2 of most frequently used spans. In this case, when a path is set between Site X and Site Y, the extracting part 213a and the determining part 213b perform the following process.

The extracting part 213a extracts CH3, CH4, CH5, CH7, and CH10 for which sections C to E are unused, and outputs the extracted channels to the determining part 213b. When the path is set between Site X and Site Y, the determining part 213b calculates the number of consecutive vacant spans left outside the path.

For example, in the example of FIG. 8, the solid arrow indicates a section set with a path and a dotted arrow indicates an unused section left after path setting. The number of consecutive vacant spans for each channel left after the path setting is as follows. In the event of setting the path to CH3, one span whose number of consecutive vacant spans is 1 is left in the section F. In the event of setting the path to CH4, one span whose number of consecutive vacant spans is 1 is left in the section B. In the event of setting the path to CH5, two spans whose number of consecutive vacant spans is 1 are left in the sections B and F. In the event of setting the path to CH7, two spans whose number of consecutive vacant spans is 2 are left in the section, A, B, F and G. In the event of setting the path to CH10, one span whose number of consecutive vacant spans is 2 is left in the sections A and B.

That is, in the event of setting the path to CH7 and CH10, the number 2 of consecutive vacant spans set with a priority is left. Of CH7 and CH10 left with the number 2 of consecutive vacant spans, the determining part 213b selects CH10 left with the fewer number of spans set with the priority. Alternatively, the determining part 213b may select a channel in random among channels left with the number of spans set with a priority.

Although it has been described in this example that the determining part 213b sets a path to a channel left with the number of consecutive vacant spans set with a priority, the present disclosure is not limited thereto. When there exists a channel for which only a section between the start point site and the end point site is unused, the determining part 213b may preferentially select the very channel. That is, when there exists a channel for which the number of vacant spans is 0 when a path is set, the determining part 213b may preferentially select the very channel.

(Hardware Configuration of Transmission System according to Second Embodiment)

Figure 9:
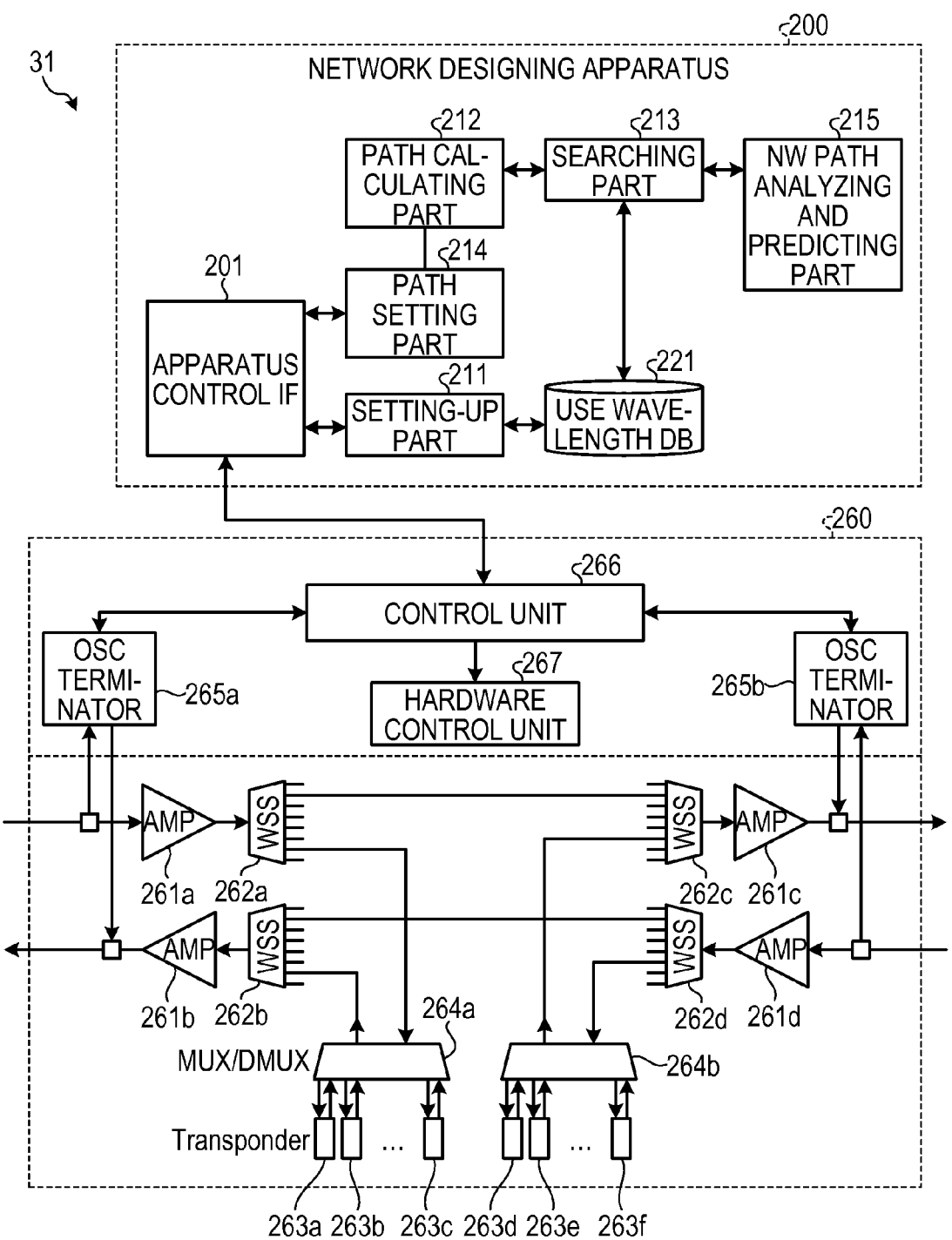
FIG. 9 is a diagram illustrating an example of a hardware configuration of a transmission system including a network designing apparatus, according to an embodiment.

FIG. 9 is a view illustrating one example of the hardware configuration of a transmission system including a network designing apparatus according to the second embodiment. As illustrated in the example of FIG. 9, a transmission system 31 includes a network designing apparatus 200 and a site 260. The network designing apparatus 200 includes an apparatus control IF 201, a setting-up part 211, a path calculating part 212, a searching part 213, a path setting part 214, a NW path analyzing and predicting part 215, and a use wavelength DB 221. The network designing apparatus 200 illustrated in FIG. 9 is one example of the network designing apparatus 200 illustrated in FIG. 7. The NW path analyzing and predicting part 215 is one example of the priority setting part 213c.

The apparatus control IF 201 is connected in communication with the site 260. Although one side 260 is illustrated in the example of FIG. 9 for the sake of convenience, the apparatus control IF 201 may be connected with a plurality of sites.

The site 260 includes AMPs 261a to 261d, WSSs 262a to 262d, MUXs/DMUXs 264a and 264b, OSC terminators 265a and 265b, a control unit 266, and a hardware control unit 267. The MUX/DMUX 264a includes transponders 263a to 263c. The MUX/DMUX 264b includes transponders 263d to 263f. The same elements as the transmission system 30 of the first embodiment are denoted by the same reference numerals except for the first digit and explanation of which will not be repeated as appropriate.

(Flow illustrating Path Setting Sequence)

Figure 10:
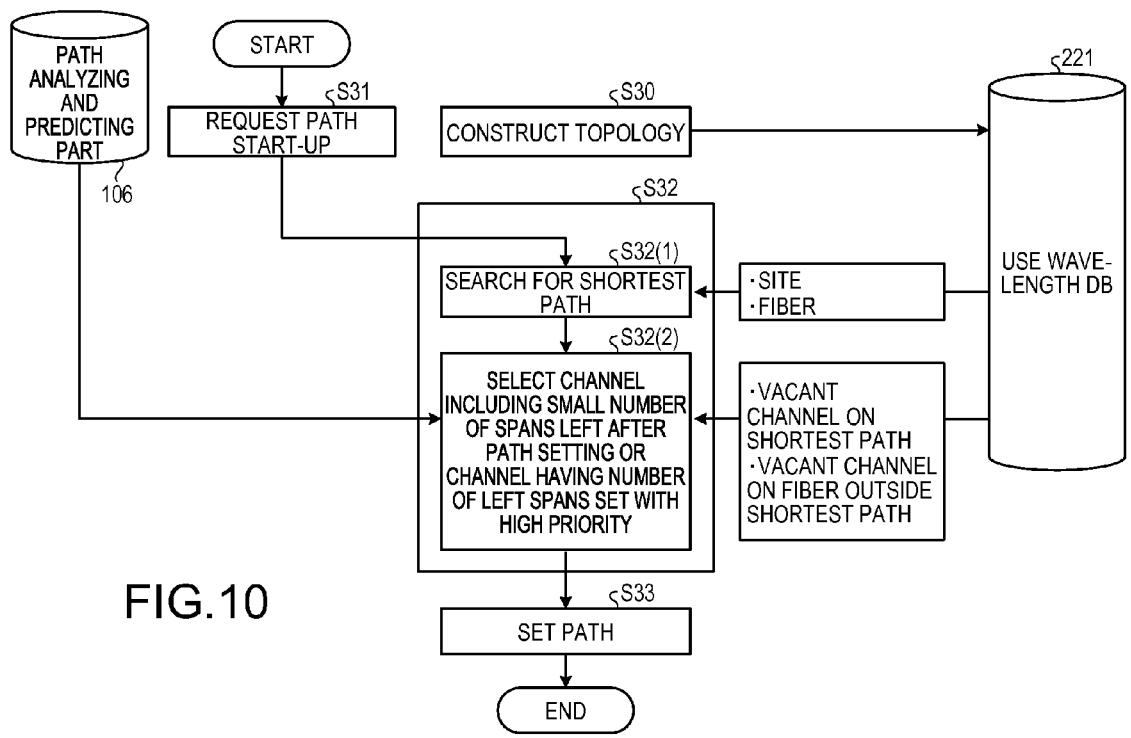
FIG. 10 is a diagram illustrating an example of an operational flowchart for a path setting sequence, according to an embodiment.

FIG. 10 is a second flowchart illustrating a path setting sequence. The setting-up part 211 detects a site in the network and constructs a topology in the detected site (Step S30). The setting-up part 211 stores information of the constructed topology in the use wavelength DB 221.

The network designing apparatus 200 receives a path start-up request (Step S31). The path calculating part 212 acquires information on the site and fiber by referring to the use wavelength DB 221, and searches for the shortest path, based on the acquired information (Step S32(1)).

The extracting part 213a acquires information on unused sections on the shortest path by referring to the use wavelength DB 221. Based on the acquired information, the extracting part 213a extracts channels for which all sections from a start point site to an end point site are unused on the shortest path.

The determining part 213b acquires information on vacant channels on the shortest path and information on vacant channels on fibers outside the shortest path from the use wavelength DB 221. The information on vacant channels on fibers outside the shortest path indicates unused sections left outside a path when the path is set. For example, when a path of C-D-E is set to a section of A-B-C-D-E, an unused section A-B is left.

The determining part 213b selects a channel having the smallest number of consecutive vacant spans including spans outside a path connecting the start and end point nodes or a channel left with the number of consecutive vacant spans set with a high priority, among the channels extracted by the extracting part 213a (Step S32(2)). Details of the channel selection will be described below with a sub flow.

The path setting part 214 controls each site through the apparatus control IF 201, and sets the path selected in the path calculating part 212 to the channel selected in the determining part 213b (Step S33).

(Flow illustrating Channel Selecting Sequence)

Figure 11A:
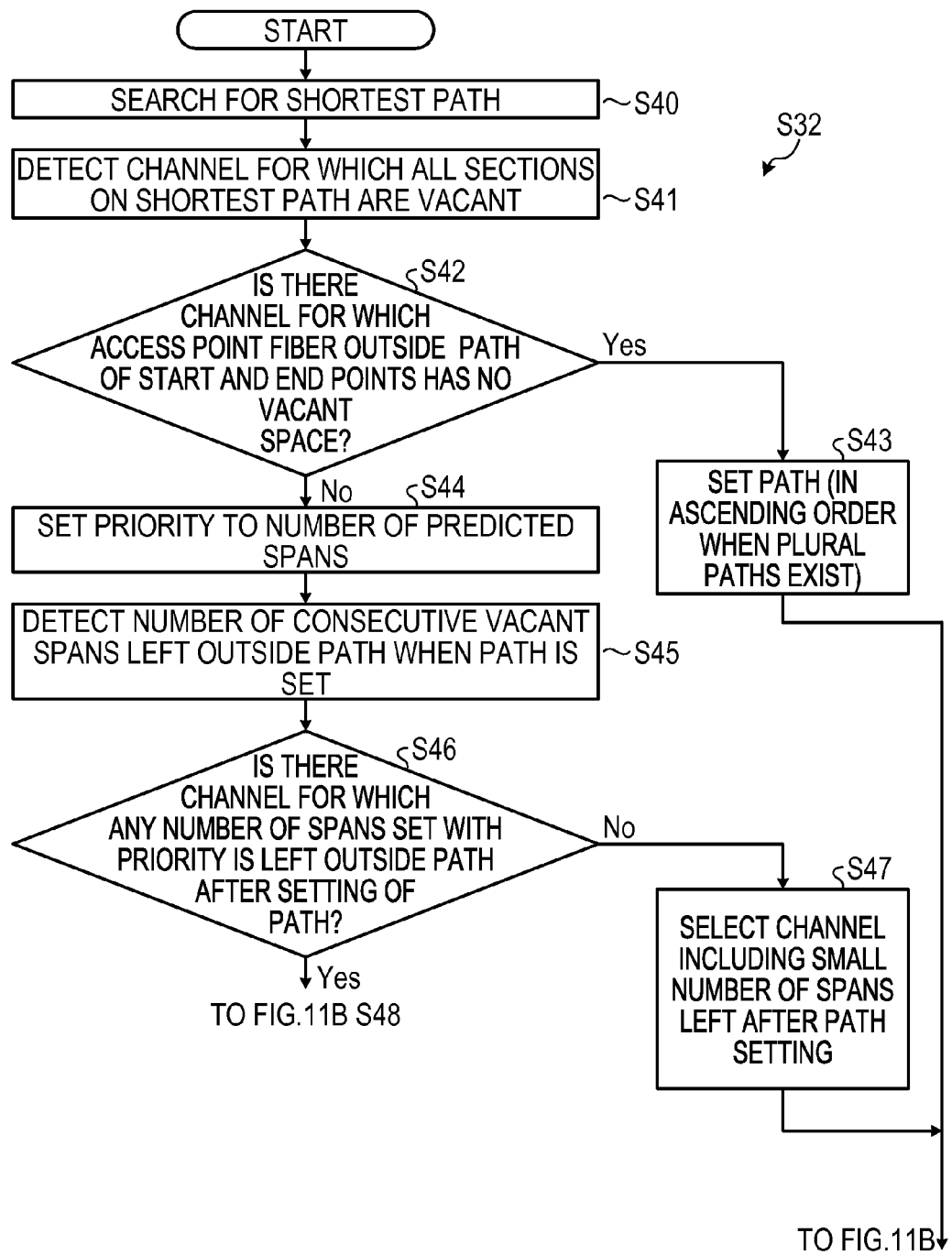

FIGS. 11A and 11B are diagrams illustrating an example of an operational flowchart for a channel selecting sequence used for paths. The flow of FIGS. 11A and 11B correspond to Step S32. The path calculating part 212 acquires information on the site and fiber by referring to the use wavelength DB 221 and searches for the shortest path based on the acquired information (Step S40)

The extracting part 213a detects channels for which all sections on the shortest path are vacant (Step S41). The determining part 213b determines whether or not there is a channel for which an access point fiber outside the path of start and end points has no vacant space, among the channels detected by the extracting part 213a (Step S42). That is, since only sections between the start point site and the end point site are unused, the determining part 213b determines whether or not there exists a channel for which the number of vacant spans is 0 when the path is set.

When there is a channel for which an access point fiber outside the path of start and end points has no vacant space (Yes in Step S42), the determining part 213b sets the channel to the path. In the meantime, when there is no channel for which an access point fiber outside the path of start and end points has no vacant space (No in Step S42), the determining part 213b proceeds to Step S44.

The priority setting part 213c sets a priority to the number of predicted spans (Step S44). For example, the priority setting part 213c sets a priority in the order of the number of spans having the higher use frequency in a path on the network.

The extracting part 213a detects the number of consecutive vacant spans left outside a path when the path is set (Step S45). The determining part 213b determines whether or not there is any channel for which any number of spans set with a priority is left outside the path after setting of the path (Step S46). When there is any channel for which any number of spans set with a priority is left outside the path after setting of the path (Yes in Step S46), the determining part 213b proceeds to Step S48. When there is no channel for which any number of spans set with a priority is left outside the path after setting of the path (No in Step S46), the determining part 213b proceeds to Step S47. That is, when a path is set, the determining part 213b determines whether or not an unused section of the number of spans set with a priority is included in an unused section of both ends of a start point site and an end point site of the path.

The determining part 213b selects a channel having the smaller number of spans left after the path setting (Step S47).

The determining part 213b determines whether or not there is any channel for which the number of spans having the highest priority is left outside the path after the path setting (Step S48). When there is any channel for which the number of spans having the highest priority is left outside the path after the path setting (Yes in Step S48), the determining part 213b proceeds to Step S50. In the meantime, when there is no channel for which the number of spans having the highest priority is left outside the path after the path setting (No in Step S48), the determining part 213b proceeds to Step S49.

The determining part 213b determines whether or not there is any channel for which the number of spans having the second highest priority is left outside the path after the path setting (Step S49). When there is any channel for which the number of spans having the second highest priority is left outside the path after the path setting (Yes in Step S49), the determining part 213b proceeds to Step S50. In the meantime, when there is no channel for which the number of spans having the second highest priority is left outside the path after the path setting (No in Step S49), the determining part 213b performs Step S49 recursively to determine whether or not there is the number of spans having the third highest priority (Step S49).

The determining part 213b determines whether or not there is any channel for which the number of spans having other priority is left outside the path (Step S50). For example, it is assumed that the priority setting part 213c sets the highest priority to the number 3 of consecutive vacant spans and sets the second highest priority to the number 2 of consecutive vacant spans. In this case, when the number 3 of spans and the number 2 of spans are left outside the pass after the path setting, the determining part 213b determines that there is any channel left with the number 2 of spans set with the second highest priority other than the number 3 of spans set with the highest priority.

When there is any channel for which the number of spans having other priority is left outside the path (Yes in Step S50), the determining part 213b proceeds to Step S51. In the meantime, when there is no channel for which the number of spans having other priority is left outside the path (No in Step S50), the determining part 213b proceeds to Step S52.

The determining part 213b selects a channel having the smaller number of spans set with a priority (Step S52). For example, when there is a channel for which one of three spans set with the same priority is left in one side of the path and a channel for which the two spans are left in both sides of the path, the determining part 213b selects the channel for which the one span is left in one side of the path.

The determining part 213b selects a channel having the small number of left spans set with the priority and having the number of spans set with other higher priority (Step S51). For example, it is assumed that the priority setting part 213c sets the highest priority to the number 3 of consecutive vacant spans, the second highest priority to the number 2 of consecutive vacant spans, and the third highest priority to the number 4 of consecutive vacant spans. In this case, when there is a channel A for which the number 3 of vacant spans is left in one side of the path after the path setting and the number 2 of vacant spans is left in the other side of the path and a channel B for which the number 3 of vacant spans is left in one side of the path after the path setting and the number 4 of vacant spans is left in the other side of the path, the determining part 213b selects the channel A.

(Advantages)

As described above, the network designing apparatus 200 further includes a setting part for setting a priority to each of the number of consecutive vacant unused spans. If there is any channel for which the number of consecutive vacant spans set with a priority is left outside the path, among the channels extracted by the extracting part, the determining part 213b determines this channel as a channel set to the path. This may result in increase in efficiency of accommodation of signals in fibers. The setting part is one example of the priority setting part 213c.

The setting part sets a priority to each of the number of consecutive vacant spans, based on the use frequency of consecutive vacant spans in the network. This makes it possible to estimate the number of spans which is likely to be used on the network, based on the use frequency.

When there is a channel with which the entire span is filled, the determining part 213b determines this channel as a channel set to the path. This may result in increase in efficiency of accommodation of signals in fibers.

Figure 12:
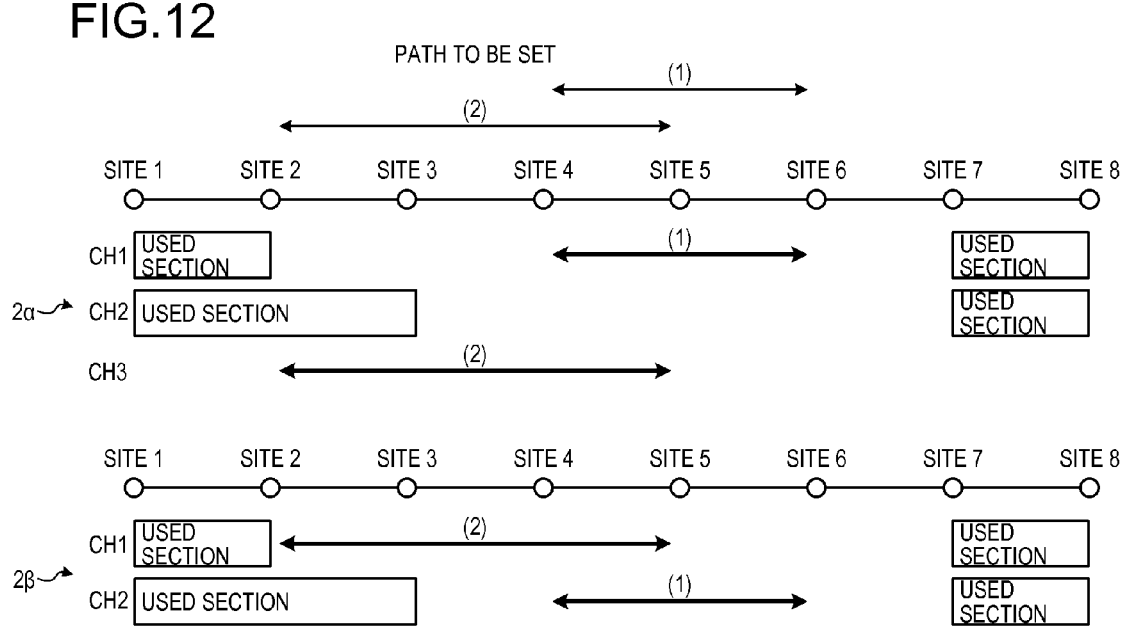
FIG. 12 is a diagram illustrating an example of comparison in advantages between a reference example and an embodiment.

FIG. 12 is a first view for comparison in advantage between a first reference example and the second embodiment. The example of FIG. 12 illustrates path setting 2a of the first reference example and path setting 2B of the second embodiment. The path setting 2a of the first reference example and the path setting 2B of the second embodiment have the same used and unused sections as the example of FIG. 17.

A network designing apparatus of the first reference example selects CH1 having the smallest channel number, among CH1, CH2, and CH3 which can set a path (1), and sets CH1 to the path (1). Next, the network designing apparatus sets a path (2) to the unused CH3 since the path (2) is unable to be set to CH1 and CH2.

In the meantime, in the second embodiment, the priority setting part 213c sets a priority to the number 3 of consecutive vacant spans. In this case, the network designing apparatus 200 sets the path (1) to CH2 having the smallest number of spans left after the path setting since the number of consecutive vacant spans is not 3 even when the path (1) is set to any of CH1 and CH2. In this manner, since the network designing apparatus 200 of the second embodiment sets the paths (1) and (2) to the used channels, the network designing apparatus 200 may use network resources more efficiently than the network designing apparatus of the first reference example.

Figure 13:
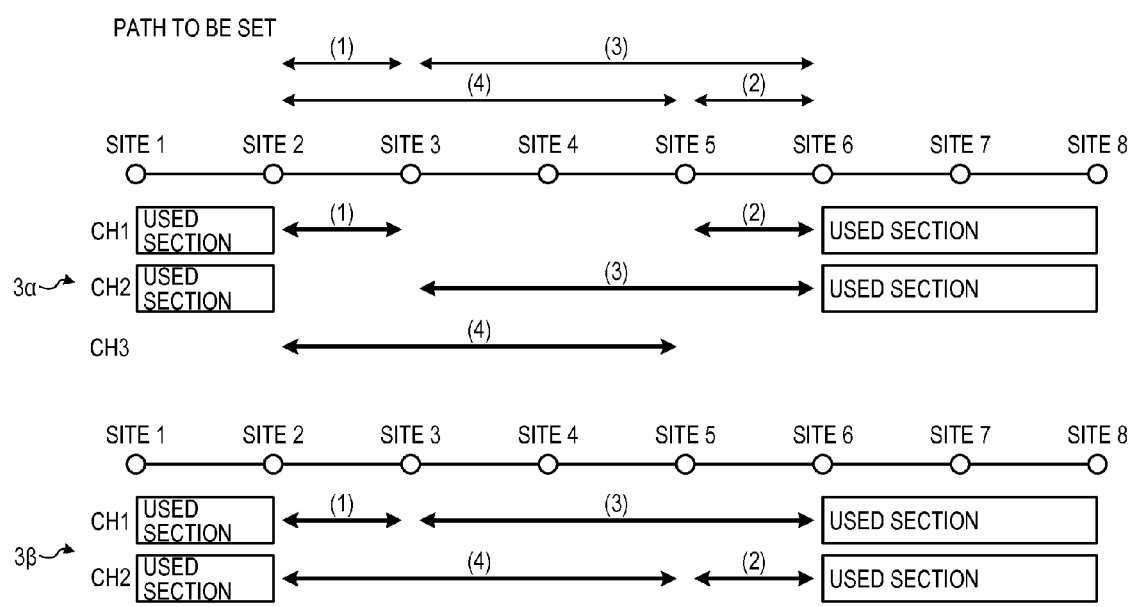
FIG. 13 is a diagram illustrating an example of comparison in advantages between a reference example and an embodiment.

FIG. 13 is a second view for comparison in advantage between a second reference example and the second embodiment. The example of FIG. 13 illustrates path setting 3a of the first reference example and path setting 3B of the second embodiment. For example, CH1 has a Site 1 to Site 2 as used section, a Site 6 to Site 8 as used section, and a Site 2 to Site 6 as unused section. CH2 has a Site 1 to Site 2 as used section, a Site 6 to Site 8 as used section, and a Site 2 to Site 6 as unused section. CH3 is a channel for which all sections are unused.

A network designing apparatus 200 of the second reference example selects CH1 having the smallest channel number, among CH1, CH2, and CH3 which are able to set a path (1), and sets the path (1) to CH1. Next, the network designing apparatus 200 selects CH1 having the smallest channel number, among CH1, CH2, and CH3 which are able to set a path (2), and sets the path (2) to CH2. Next, the network designing apparatus 200 sets a path (3) to CH2 since the path (3) is unable to be set to CH1. Next, the network designing apparatus sets the path (3) to CH3 since a path (4) is unable to be set to CH1 and CH2.

In the meantime, in the second embodiment, the priority setting part 213c sets a priority to the number 3 of consecutive vacant spans. The network designing apparatus 200 sets the path (1) to CH1 since the number of consecutive vacant spans left in CH1 is 3 when the path (1) is set to CH1. Next, the network designing apparatus 200 sets the path (2) to CH2 since the number of consecutive vacant spans left in CH2 is 3 when the path (2) is set to CH2. Next, the network designing apparatus 200 sets the path (3) to CH1. Next, the network designing apparatus 200 sets the path (4) to CH2. In this manner, since the network designing apparatus 200 of the second embodiment sets the paths (1) to (4) to the used channels, the network designing apparatus 200 may use network resources more efficiently than the network designing apparatus of the second reference example.

(Other Hardware Configuration according to First Embodiment)

Although it has been described in the first embodiment that the network designing apparatus 100 is connected in communication with the site 160 and controls the site 160 via a network, the present disclosure is not limited thereto. For example, the network designing apparatus 100 may be included in each site.

Figure 14:
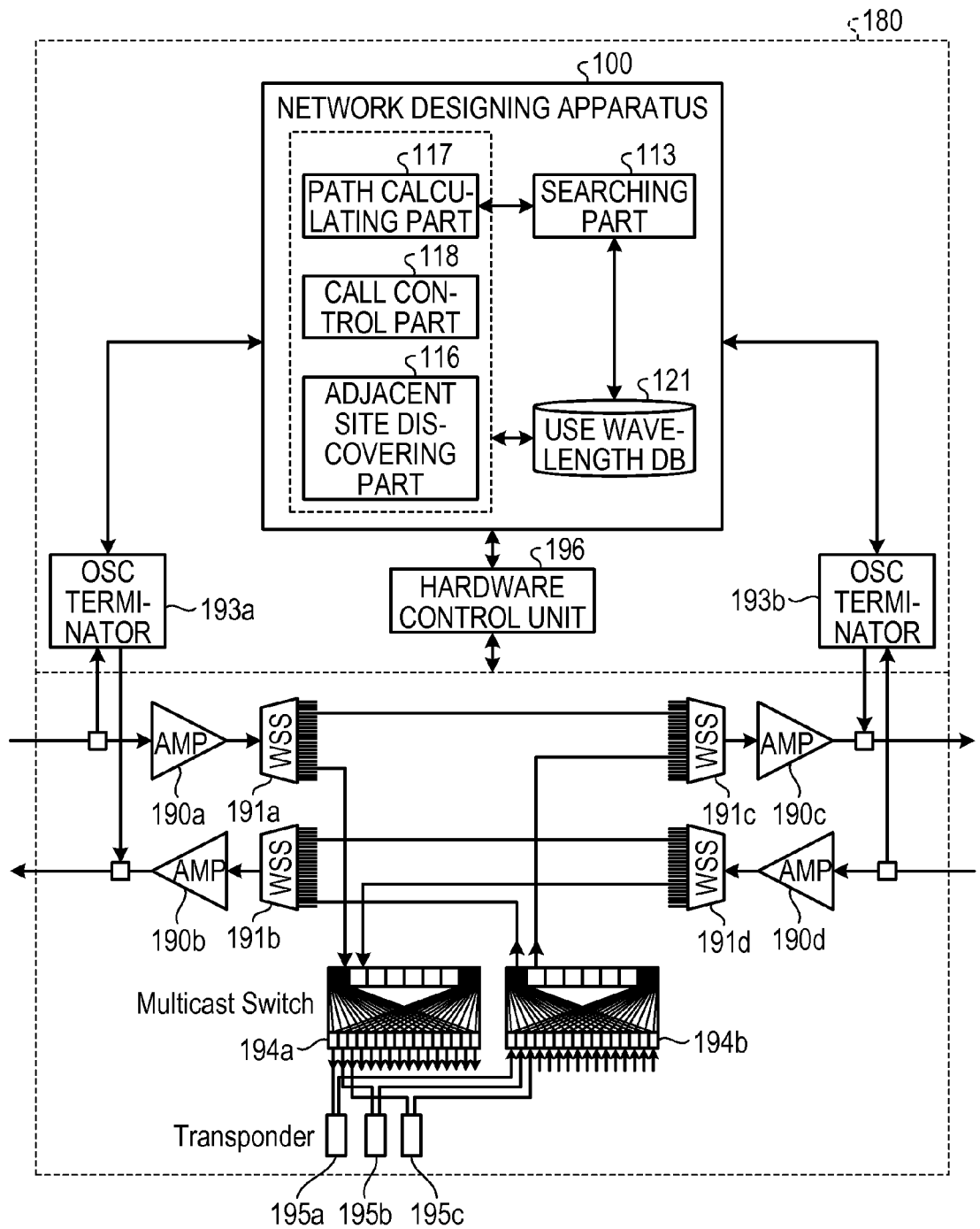
FIG. 14 is a diagram illustrating an example of a hardware configuration of a transmission system, according to an embodiment.

FIG. 14 is a view illustrating one example of the hardware configuration of a site, according to the first embodiment. As illustrated in the example of FIG. 14, a site 180 includes a network designing apparatus 100, AMPs 190a to 190d, WSSs 191a to 191d, OSC terminators 193a and 193b, multicast switches 194a and 194b, and a hardware control unit 196. Each of the multicast switches 194a and 194b includes transponders 195a to 195c.

In the example of FIG. 14, the network designing apparatus 100 includes a searching part 116, an adjacent site discovering part 116, a path calculating part 117, a call control part 118, and a use wavelength DB 121. The adjacent site discovering part 116 discovers a site adjacent to its own site in a network. The path calculating part 117 obtains the shortest path when paths are set. The call control part 118 transmits a control signal to the adjacent site and sets a path between its own site and the adjacent site. The searching part 113 searches for a channel to be set to the path, among channels which may be used for the shortest path obtained by the path calculating part 112.

Each of the multicast switches 194a and 194b includes (N×M) optical port switches. Each of the multicast switches 194a and 194b may couple a signal, which is input from any transponder, to any port.

(Other Hardware Configuration according to Second Embodiment)

Figure 15:
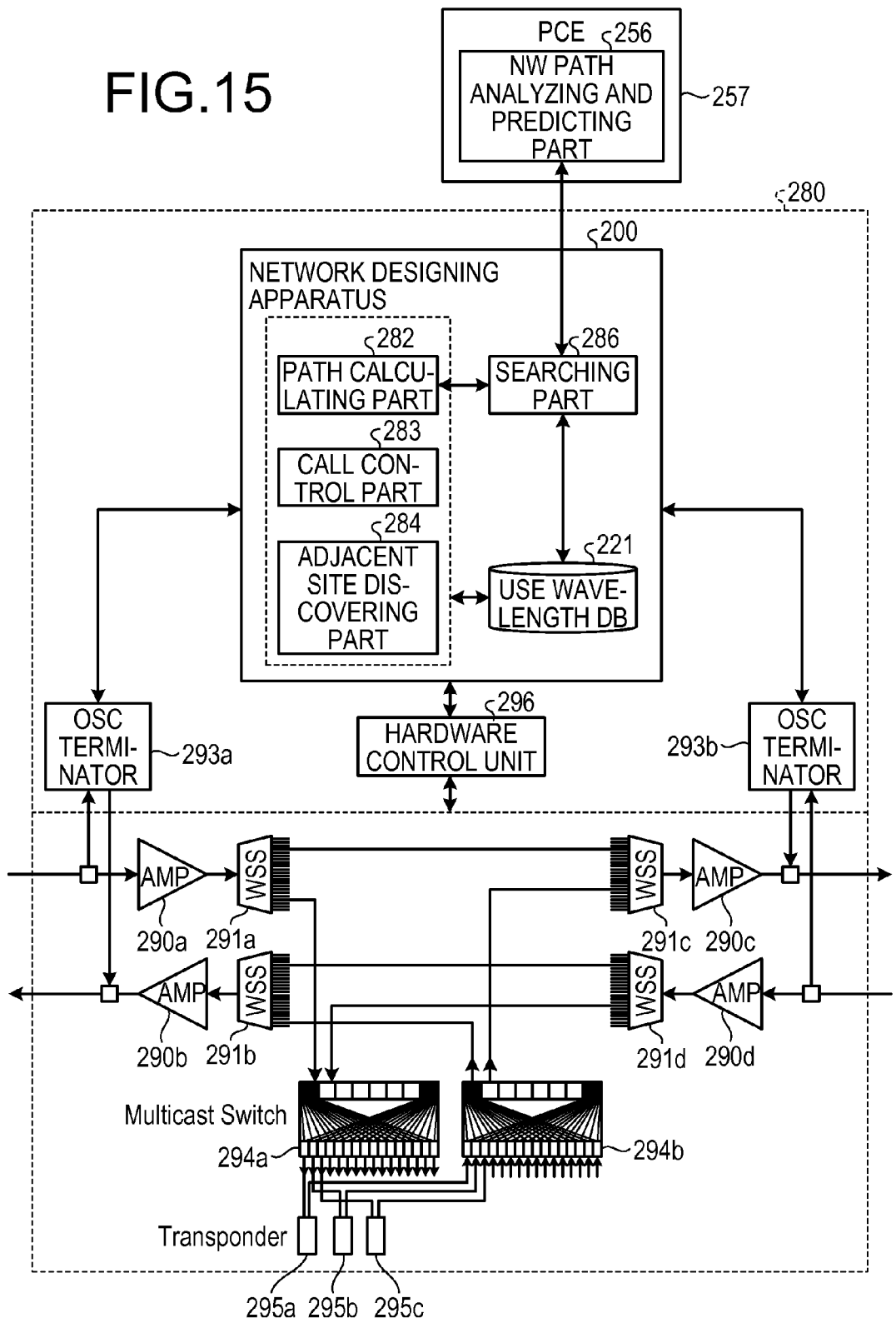
FIG. 15 is a diagram illustrating an example of a hardware configuration of a transmission system, according to an embodiment.

FIG. 15 is a view illustrating one example of the hardware configuration of a site, according to the second embodiment. As illustrated in the example of FIG. 15, a site 280 includes a network designing apparatus 200, AMPs 290a to 290d, WSSs 291a to 291d, OSC terminators 293a and 293b, multicast switches 294a and 294b, and a hardware control unit 296. Each of the multicast switches 294a and 294b includes transponders 295a to 295c.

The network designing apparatus 200 is connected in communication with a server 257 including an NW path analyzing and predicting part 256. This example is different from the example of FIG. 14 in that the network designing apparatus 200 is connected to the server 257. The NW path analyzing and predicting part 256 makes analysis and prediction of paths on a network. For example, the NW path analyzing and predicting part 256 counts the number of spans of all paths on the network and outputs the counted number of spans to the searching part 286. The searching part 286 obtains the use frequency for each of the number of spans, based on the output number of spans, and sets a priority to each of the number of spans.

(Other Aspects related to Embodiments)

Hereinafter, some of modifications of the above-described embodiments will be described. In addition to the following modifications, it should be understood that a change in design may be appropriately made without departing from the scope and spirit of the present disclosure.

Although it has been described in the second embodiment that the priority setting part 213c sets a priority to each of the number of spans, based on the use frequency, the present disclosure is not limited thereto. For example, the network designing apparatus 200 may allow a user to set a priority.

The priority setting part 213c may set a priority to each of the number of spans, based on the use frequency in paths having start and end points coincident with each other. For example, it is assumed that a start point of a path to be set is Site A, an end point thereof is Site D, and two paths, i.e., a path of A-B-C-D and a path of A-E-F-D, may be selected. In this case, the priority setting part 213c obtains the use frequency for each of the number of spans in the path of A-B-C-D and the path of A-E-F-D and sets a priority to each of the number of spans, based on the obtained use frequency.

In addition, the priority setting part 213c may set a priority to each of the number of spans, based on the use frequency in paths having start and end points coincident with each other and having the same routes. For example, it is assumed that a start point of a path to be set is Site A, an end point thereof is Site D, and the determining part 213b selects a path of A-B-C-D of two paths, i.e., a path of A-B-C-D and a path of A-E-F-D. In this case, the priority setting part 213c obtains the use frequency for each of the number of spans in the path of A-B-C-D and sets a priority to each of the number of spans, based on the obtained use frequency.

Although the line-typed topology 10 is illustrated in the example of FIG. 2 according to the first embodiment, the present disclosure is not limited thereto. For example, in the network designing apparatus 100 of the first embodiment, the path may be branched at Site X or Site Y. When the path is branched at Site X or Site Y, the network designing apparatus 100 selects a path having the smallest number of consecutive vacant spans among branching paths.

Although the line-typed topology 20 is illustrated in the example of FIG. 8 according to the second embodiment, the present disclosure is not limited thereto. For example, in the network designing apparatus 200 of the second embodiment, the path may be branched at Site X or Site Y. When the path is branched at Site X or Site Y, the network designing apparatus 200 sets a priority to each of branching paths.

The processing sequence, control sequence, detailed names, and information including a variety of data and parameters may be arbitrarily changed unless stated particularly otherwise.

(Hardware Configuration of Information Processor)

Figure 16:
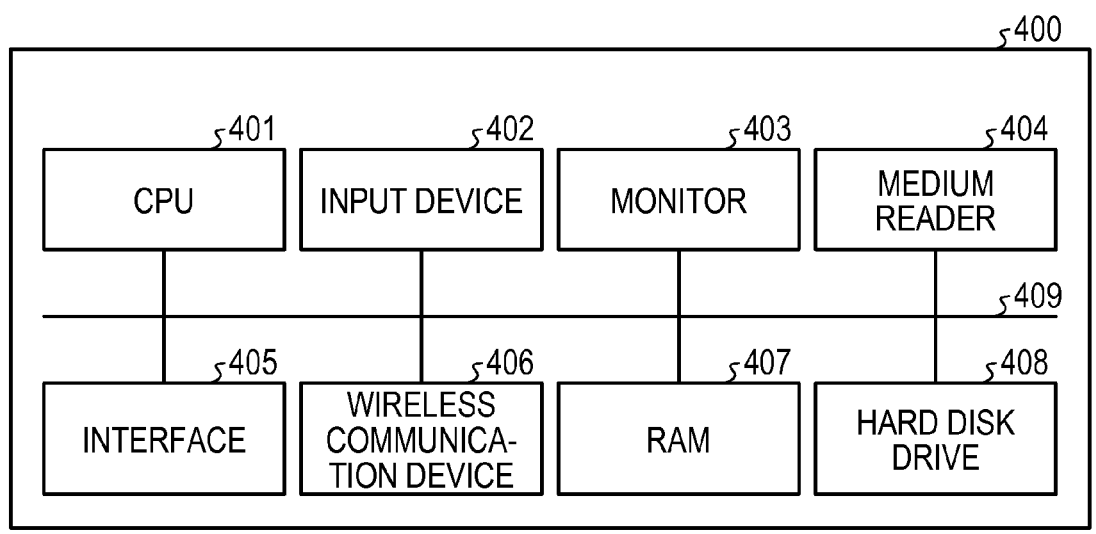
FIG. 16 is a diagram illustrating an example of a hardware configuration of a network designing apparatus, according to an embodiment.

FIG. 16 is a view illustrating one example of the hardware configuration of the network designing apparatus of an embodiment. As illustrated in the example of FIG. 16, a computer 400 includes CPU 401 which executes a variety of arithmetic processing, an input device 402 which receives data from a user, and a monitor 403. The computer 400 further includes a medium reader 404 which reads programs and so on from a storage medium, an interface device 405 for connection with another device, and a wireless communication device 406 for wireless connection with another device. The computer 400 further includes RAM 407 which temporarily stores a variety of information, and a hard disk drive 408. These devices 401 and 408 are connected to a bus 409.

The hard disk drive 408 is stored with information processing programs having functions such as processing portions of the setting-up part 111, the path calculating part 112, the searching part 113, and the path setting part 114 illustrated in FIG. 1. The hard disk drive 408 is further stored with a variety of data for implementing the information processing programs.

The CPU 401 reads the programs stored in the hard disk drive 408 and performs a variety of processing by deploying the read programs in the RAM 407. These programs may cause the computer 400 to function as the setting-up part 111, the path calculating part 112, the searching part 113, and the path setting part 114 illustrated in FIG. 1.

The information processing programs may not necessarily be stored in the hard disk drive 408. For example, the programs stored in a storage medium readable by the computer 400 may be read and executed by the computer 400. Examples of the storage medium readable by the computer 400 may include a portable recording medium, such as a CD-ROM, a DVD disc, and a USB (Universal Serial Bus) memory, a semiconductor memory such as a flash memory, and a hard disk drive. In addition, the programs may be stored in a device connected to, for example, a public network, the Internet, or LAN (Local Area Network), and may be read therefrom and executed by the computer 400.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for designing a communication network, the apparatus comprising:
a memory configured to store use-wavelength information identifying, for each of one or more spans between a start point node and an end point node of a path to be set in the communication network, at least one of a plurality of channels which is in use in the each span, the one or more spans each indicating a section between adjacent nodes on the path;
a processor configured:
to extract unallocated channels each including one or more consecutive spans, which are not in use by the each unallocated channel and capable of accommodating the path, by identifying, for each of the plurality of channels, a span in which the each channel is not in use, from among the one or more spans, based on the use-wavelength information, and
to determine one of the extracted unallocated channels including the one or more consecutive spans whose number is minimum among the extracted unallocated channels, as a channel to be set to the path.

2. The apparatus of claim 1, wherein
the processor is configured to set a priority to each number of the one or more consecutive spans; and
when, among the extracted unallocated channels, there exists a first channel which includes, outside the path, a part of the one or more consecutive spans whose number is set with the priority, the processor determines the first channel as a channel to be set to the path.

3. The apparatus of claim 2, wherein
the processor sets the priority to each number of the one or more consecutive spans, based on a use frequency of each of the one or more consecutive spans in the communication network.

4. The apparatus of claim 2, wherein,
when there is a second channel whose spans are all allocated when the path is set to the second channel, the processor determines the second channel as a channel to be set to the path.

5. A method performed by a computer, the method comprising:
providing use-wavelength information identifying, for each of one or more spans between a start point node and an end point node of a path to be set in the communication network, at least one of a plurality of channels which is in use in the each span, the one or more spans each indicating a section between adjacent nodes on the path;
extracting unallocated channels each including one or more consecutive spans, which are not being used by the each unallocated channel and capable of accommodating the path, by identifying, for each of the plurality of channels, a span in which the each channel is not in use, from among the one or more spans, based on use-wavelength information; and
determining one of the extracted unallocated channels including the one or more consecutive spans whose number is minimum among the extracted unallocated channels, as a channel to be set to the path.

6. A system comprising:
a network designing apparatus including a memory, and a processor coupled to the memory; and
nodes configured to form a communication network, the nodes being coupled in communication with the network designing apparatus, wherein
the memory of the network designing apparatus is configured:
to store use-wavelength information identifying, for each of one or more spans between a start point node and an end point node of a path to be set in the communication network, at least one of a plurality of channels which is in use in the each span, the one or more spans each indicating a section between adjacent nodes on the path; and
the processor of the network designing apparatus is configured:
to extract unallocated channels each including one or more consecutive spans, which are not in use by the each unallocated channel and capable of accommodating the path, by identifying, for each of the plurality of channels, a span in which the each channel is not in use, from among the one or more spans, based on the use-wavelength information, to determine one of the extracted unallocated channels including the one or more consecutive spans whose number is minimum among the extracted unallocated channels, as a channel to be set to the path, and to notify the nodes of the determined channel; and each of the nodes is configured to set the channel notified from the network designing apparatus to the path.

* * * * *